United States Patent Office 3,334,988
Patented Aug. 8, 1967

3,334,988
METHOD FOR PREPARATION OF SYNGENITE FERTILIZER CARRIER FROM $K_2SO_4$ AND $CaSO_4$ AND PRODUCT
William Sidney Newsom, Jr., Mount Prospect, Ill., assignor to International Minerals & Chemical Corporation, a corporation of New York
No Drawing. Filed June 29, 1964, Ser. No. 378,974
10 Claims. (Cl. 71—63)

This invention relates to a method for the preparation of a low bulk density absorbent fertilizer raw material and to the product so produced. In one of its aspects this invention relates to a method for preparing a fertilizer raw material of low bulk density containing potash which gives up its potash content to growing plants in soil at a slow rate. In another of its aspects this invention relates to a low bulk density fertilizer raw material useful as a bulking agent, a neutralizing agent, an absorptive carrier material for pesticides and liquid plant nutrients, as an anti-caking agent, and as a source of plant nutrients.

In lawn and garden plant food compositions it is a conventional practice to incorporate a bulking agent, such as expanded vermiculite, to facilitate uniform distribution of the plant nutrient in conventional spreading equipment. Other typical bulking agents include corn cobs, and peanut, rice and cottonseed hulls. While such materials are relatively good bulking agents, they contribute little, if anything, to the nutrient value of the total composition. Vermiculite is probably the most popular raw material used for lawn and garden fertilizer compositions because of its capacity to function as an adsorptive carrier for pesticides as well as normally liquid plant nutrient material, as for example, typical commercial nitrogen solutions containing ammonia, ammonium nitrate and/or urea. I have now provided a new fertilizer raw material which is not only a good bulking agent and adsorptive carrier but which is also capable in itself of contributing nutrient value for plants. Further, in one of its embodiments, my material is capable of use as a non-burning, slow-release fertilizer.

It is, therefore, an object of the present invention to provide a method for the preparation of a low bulk density absorbent fertilizer raw material.

It is another object of this invention to provide a low bulk density fertilizer raw material having varied utility in agricultural arts.

It is a further object of this invention to provide a low bulk density fertilizer raw material useful as a non-burning slow-release fertilizer.

Additional objects of the present invention will be apparent from the description which follows.

In a general aspect, the present invention involves a method for the preparation of a low bulk density absorbent fertilizer raw material which comprises mixing or slurrying in water a $CaSO_4$-contributing material and a $K_2SO_4$-contributing material to provide at least 0.46 mole of $K_2SO_4$ for each mole of $CaSO_4$ whereby there is formed a thixotropic gel containing syngenite. After the gel has set, it is dried to eliminate at least about 70% of the free water contained therein, and preferably about 90 to 99% of the free water. After the gel has been dried it is then sized to a desired particle size, as for example, by suitable grinding and sizing procedures. The dried syngenite gel produced in accordance with this method is friable so that severe grinding procedures should be avoided in order to minimize dust formation. The equipment and procedures normally employed for cutting and sizing denned superphosphate can be conveniently employed.

Syngenite is a naturally occurring mineral having the general composition $CaSO_4 \cdot K_2SO_4 \cdot H_2O$. To the best of my knowledge it has never been proposed as a fertilizer raw material in a naturally occurring state, much less as prepared by my method wherein control can be exercised over the bulk density of the product.

Materials used in the preparation of the syngenite gel are, in general, materials capable of contributing calcium sulfate ($CaSO_4$) and potassium sulfate ($K_2SO_4$). In the case of calcium sulfate these materials may be $CaSO_4$ itself in the form of anhydrite, hemihydrate and dihydrate (gypsum), materials containing $CaSO_4$ such as normal superphosphate, or materials capable of reacting to provide $CaSO_4$ in situ, as for example, triple superphosphate which can react with $K_2SO_4$ to provide $CaSO_4$. Other examples of $CaSO_4$-contributing materials are slaked lime ($Ca(OH)_2$) plus $H_2SO_4$ or $K_2SO_4$, limestone plus $H_2SO_4$ and mineral gypsum, such as is used in the manufacture of wallboard. Although mineral gypsum can be employed as a $CaSO_4$-contributing material, it is not particularly preferred since the final product resulting from the use of this material tends to have a high bulk density. The preferred $CaSO_4$-contributing materials are gypsum produced as a by-product in the production of wet process phosphoric acid, normal superphosphate containing $CaSO_4$, and $Ca(OH)_2 + K_2SO_4$. There are certain benefits accruing from the use of normal superphosphate and triple superphosphate as $CaSO_4$-contributing materials. These benefits arise from the contribution of soluble $P_2O_5$ nutrient value to the resultant material.

The $K_2SO_4$-contributing material employed in my method is preferably agricultural grade $K_2SO_4$. I have found, however, that up to about 19% by weight of the $K_2SO_4$ required can be contributed by langbeinite which is a naturally occurring mineral having the composition $MgSO_4 \cdot K_2SO_4$. The use of langbeinite as a $K_2SO_4$-contributing material beyond the 19% proportion, retards the formation of a syngenite gel and may thus be employed to prevent the setting up of the slurry in the mixing vessel. Another benefit accruing in the use of langbeinite is when normal superphosphate or triple superphosphate is the $CaSO_4$-contributing material and ammonia-containing material is added, the resultant formation of magnesium ammonium phosphate provides a product which gives up its nitrogen, $P_2O_5$ and MgO to growing plants at a slow rate. In an embodiment such as this, the three major plant nutrients, viz, N, $P_2O_5$, and $K_2O$, are all released from the final product over a longer period of time and thus diminish considerably the burning effect which highly water soluble nutrients tend to exhibit.

It is also possible to add other materials to the aqueous slurry containing the $CaSO_4$- and $K_2SO_4$-contributing materials prior to the formation of the thixotropic gel. Care should be taken, however, that the pH of the gel-forming mixture not be below about 1.0 since syngenite tends to decompose under highly acid conditions. This is not true of alkaline conditions. It should be noted that in general the addition of such materials, except for blowing agents, which will be described in more detail hereinafter, tend to cause the final product to have an increased bulk density. Materials which can be added prior to gel formation include commercial liquid nitrogen solutions containing ammonia, ammonium nitrate and/or urea; and the like. Ureaform materials, such as methylol ureas as are contained in the commercial ureaformaldehyde concentrates, for example, a concentrate 60% formaldehyde, 25% urea and 15% water, however, tend to decrease bulk density. These materials, it will be noted, contribute plant nutrient value to the final product. It will be appreciated, however, that the same materials may be added to the gel after it has been formed, dried and sized. The choice is purely a matter of expediency and flexibility in processing and the final use of the end product.

The $K_2SO_4$- and $CaSO_4$-contributing materials are employed in amounts sufficient to provide at least 0.5 mole of $K_2SO_4$ for each mole of $CaSO_4$ depending, in general, on the nature of the $CaSO_4$-contributing material. The lower mol ratio, viz. about 0.5, can be effectively employed when a synthetic gypsum, for example, washed, by-product gypsum, is the $CaSO_4$-contributing material. The upper limit of the $K_2SO_4$:$CaSO_4$ mol ratio is partly determined by the desired $K_2O$ analysis of the final product, the desired final bulk density, and the speed of gel formation. When $CaSO_4$ is present as $CaSO_4$, and there are no other ingredients tending to retard gel formation, a mol ratio in excess of about 1.1 causes extremely fast gel times, on the order of two seconds or less. Other considerations pertain when the $CaSO_4$ is generated in situ by reaction with $K_2SO_4$. In the case of synthetic gypsum, as the $CaSO_4$-contributing material, to maximize $K_2O$ content and minimize bulk density, a mol ratio of about 1 is preferred. With normal superphosphate as the $CaSO_4$-contributing material, optimum results are achieved at a mol ratio of about 0.8. In the case of triple superphosphate, which is predominantly monocalcium phosphate monohydrate, all of the calcium sulfate present comes from the metathetical reaction with $K_2SO_4$ and, depending upon the molar proportion of $K_2SO_4$ used, the remaining phosphate ($P_2O_5$) will be in the form of monocalcium phosphate, dicalcium phosphate, and potassium acid phosphate. I have found in this instance a mol ratio in the range of about 1.35 to about 2.0 can be suitably employed.

I have also found that there is a resonably significant and important ratio of water to total solids in the mixture, in addition to the proper proportioning of $K_2SO_4$ and $CaSO_4$, in order to achieve desirable gel formation. This ratio of water to total solids is in the range between about .8 and 1.5, preferably within about 0.9 to about 1.3, and still more preferably in the range between about 1.10 and 1.15. This ratio applies to all solids added prior to the gel formation. When no water soluble components other than $K_2SO_4$ are present in the gel-forming mixture, this ratio can be much higher, up to about 4. From a drying standpoint, this is not particularly desirable. Failure to observe this ratio will, in general, result in either no gel formation at all, an extended time to effect gelation, or an extremely short time for gel formation.

In order to reduce the bulk density of the gel product, it is desirable to employ a material capable of generating a gas in the mixture prior to setting of the gel. When the aqueous slurry contains free acid, either added or present by virtue of the $CaSO_4$-contributing material, such as normal superphosphate and triple superphosphate, a simple expedient is to incorporate a metal which releases hydrogen, such as aluminum, magnesium, iron or zinc. A preferred metal is magnesium. Also, such materials as limestone, $CaCO_3$, $Na_2CO_3$ and $NaHCO_3$ can be used. Finely pulverized limestone is the preferred carbonate. While it is possible to whip air into the mixture, this is not preferred since severe agitation tends to interfere with the development of a desirable thixotropic gel of syngenite. That is, the gel tends to be dense and finely textured rather than having desirable porous structure.

In mixing or slurrying the ingredients mentioned hereinabove, it is desirable that moderate heating be done. Preferably the temperature of the slurry is in the range of 40 to 60° C., although temperatures as low as 20° C. and as high as 100° C. can be employed. It has been noted that higher temperatures tend to promote a low bulk density in the final product, absent other factors mentioned hereinabove tending to increase bulk density. It is also desirable that in the formation of the slurry, severe agitation be avoided, for the reasons aforementioned. Under average conditions, after mixing together of the ingredients, gel formation will take place within from about 20 seconds to about 10 minutes. It is the preferred practice to have gelation take place in about 1 or 2 minutes. The time of steeing or gel formation can be controlled by the nature and proportions of the ingredients slurried. For example, the inclusion of langbeinite tends to lengthen the setting time. It may be desirable for reasons other than the nature of the end product, to control the setting time. That is, if the slurry prior to setting is to be distributed in shallow pans or other containers for expeditious drying or handling, there should obviously be enough time prior to setting to be able to accomplish this purpose. It will be apparent from what has been said hereinbefore that there is considerable flexibility in both ingredients and processing conditions to achieve any desired result both from the standpoint of end product or ease of processing.

After the gel has been formed, it is dried by conventional procedures, such as in an oven or kiln. In the drying operation care should be taken so that the gel temperature does not exceed about 105 to 110° C. This expedient is to avoid destruction of the syngenite structure by the removal of water of crystallization therein. In general, the gel temperature should be within the range of about 80 to about 110° C. during the drying step. Obviously, the time required to effect drying will be dependent upon the temperature of the air or other drying media. Hot, circulating air is a preferred procedure, and the air may vary anywhere from 100° to 650° C. Air temperature above 650° C. will cause crusting and fusing of the gel, especially if normal or triple superphosphate has been used. This is due to the formation of polyphosphates. It should be noted that the evaporation of free water from the gel during the drying step will tend to keep the gel temperature down. Such evaporation also contributes to the open cell structure and, hence, absorbency of the final product. Drying to remove at least 70% of the free water in the gel, and preferably about 90 to 99% is important.

After drying, the gel is sized to a desirable particle size by suitable grinding and sizing procedures as described hereinbefore. Since the dried syngenite gel produced is somewhat friable, severe grinding procedures should be avoided in order to minimize dust. After grinding, the product may, if desired, be screened to minimize under and oversized particles. Undersized particles and dust, if desired, can be re-used in the formation of further gels, or preferably they may be used as a conditioning or anti-caking agent for conventional mixed fertilizers and fertilizer materials such as urea and/or ammonium nitrate prills which tend to cake without conditioning. In general, depending upon the nature of the starting materials, the temperature of gel formation and the use of blowing agents or otherwise incorporating air prior to gel formation, I have found that my raw material fertilizer product will have a bulk density, based on a product having 100% particle size of $-4$ $+20$ Tyler mesh, from about 12 to about 22 lbs. per cubic foot. Absent a blowing agent and gel formation at a temperature of about 40° C., a bulk density of about 12 lbs. per cubic foot for a 100% $-4$ $+20$ particle sized product is achieved using calcium sulfate by-product of phosphoric acid production and agricultural grade $K_2SO_4$ in a mole ratio of about 1.0 mole of $K_2SO_4$ per mole of $CaSO_4$ at a water to total solids ratio of about 2.

In a preferred embodiment of my method agricultural grade potassium sulfate is dissolved in water to which there is added normal superphosphate. The normal superphosphate and $K_2SO_4$ are proportioned so that there is a molar ratio of $K_2SO_4$ to $CaSO_4$ of approximately 0.82. Immediately after addition of the superphosphate a small amount of magnesium metal is added which reacts with the free acid present in the superphosphate to generate hydrogen gas. Or about equally satisfactory, a small amount of $-200$ mesh limestone is added to generate $CO_2$. The mixing takes place at a temperature of about 40° C. and is accomplished in about 30 seconds to about 10 minutes, preferably about 1.5 minutes. As the slurry begins to thicken, but before it sets, it is poured into shallow trays where gelling occurs. These trays are transferred to an oven wherein hot air is circulated at a temperature in the range between about 60 to about 650° C. The temperature of the gel itself is not permitted to exceed about 105° C. Completeness of drying is evidenced by being able to chip the product without sticking. Preferably about 90–98% of the free moisture in the gel is removed in the drying step. After drying has been completed, the product is subjected to moderate sizing using a superphosphate cutter and screened to obtain a product having a mesh size of −4 +20 Tyler. This material will have a bulk density in a range between about 12 to about 23 lbs. per cubic foot and will, as a fertilizer material, analyze about 0-12-18 (N-$P_2O_5$-$K_2O$). This product may be used as such, as a slow release potash fertilizer, or may be used as a bulking agent and/or sorptive carrier for additional plant nutrient such as aqua ammonia, ammonium nitrate or urea solution. If desired, pesticides, such as 2,4-D, 2,4,5-T, esters and salts thereof, disodium methyl arsonate, insecticides, fungicides and the like may be incorporated. Obviously, the quantities and nature of the materials will be chosen to meet the desired criteria of the final product.

The following examples are intended to illustrate the underlying principles of the present invention and are not to be construed as unduly limiting thereof.

*Example I*

730 parts of fertilizer grade $K_2SO_4$ (50% $K_2O$) was stirred with and partialy dissolved in 2605 parts of water at a temperature of approximately 40° C. To the resulting solution 1267 parts of normal superphosphate, analyzing 19% $P_2O_5$) was slurried in, after which about 3 parts by weight of powdered aluminum was added. The slurry was agitated gently for about 40 seconds until thickening or gel formation started. At this stage the slurry was poured into shallow trays where setting or gelling occurred. The product was then dried in an oven to remove 97% of the free moisture in the gel, following which it was ground in a mill to a particle size of 100% −4 mesh and the −20 mesh portion was removed. The product had a bulk density of 21 lbs. per cubic foot and analyzed 0-11.9-17.8 N-(available $P_2O_5$)-$K_2O$.

*Example II*

450.5 parts of fertilizer grade $K_2SO_4$ (50% $K_2O$) was dissolved in 3146 parts of water, at a temperature of about 45° C. 487 parts of gypsum (by-product of wet process phosphoric acid production) which had been washed in dilute (ca. 3%) $H_2SO_4$, then washed in water, then dried and ground to pass a 28 mesh sieve (Tyler), and which assayed about 90% $CaSO_4 \cdot 2H_2O$, was added with stirring. The mixture began thickening in about 20 seconds, after which time it was immediately poured into brick molds 2″ x 4″ x 8″. Setting was complete by the time the mixture had been poured, an elapsed time of about 45 seconds after the gypsum had been added. The bricks were dried at 90° C. in an oven overnight. Before crushing, the bricks had an apparent density of about 14 lb./ft$^3$. After crushing until all the dried product passed a 6 mesh sieve, but avoiding formation of fines as much as possible, the resultant product had a bulk density of 12.6 lb./ft.$^3$ without removal of fines (considered to be any particle in the above described product which passes a 28 mesh sieve Tyler). The product had a water-soluble $K_2O$ content (as defined by the Association of Official Agricultural Chemists) of 23%. Actually syngenite has a very low solubility in water, but a step in the analytical procedure calls for reaction with ammonium oxalate, which converts the syngenite into ammonium sulfate, calcium oxalate, and potassium sulfate.

*Example III*

417.0 parts of normal superhosphate (19.65% available $P_2O_5$) were slurried with 518.2 parts of water at about 25° C., and 28 parts of 28.6% aqua ammonia were added. A urea-formaldehyde prepolymer solution was added next. This urea-formaldehyde solution was made as follows:

| | Parts |
|---|---|
| Water | 338.8 |
| Urea | 221.5 |
| Urea-formaldehyde concentrate (60% $CH_2O$, 25% urea, 15% water) | 154.4 |

The pH of the slurry, after addition of the urea-formaldehyde prepolymer was 3.6 which is in the proper range for preparing agricultural ureaform. Next 227 parts of finely ground langbeinite (18.4% MgO and 22.2% $K_2O$) was added. This addition was immediately followed by the addition of 140 parts of $K_2SO_4$, fertilizer grade (50.03% $K_2O$). The slurry became very thick 8 minutes after the $K_2SO_4$ was added, and was poured into a shallow vessel, and dried at about 80° C. for approximately 66 hours. The resultant dried product was ground to pass a 4 mesh sieve (Tyler) and found to have a bulk density of 27 lb./ft.$^3$. Its analysis was 11.6% N, 7.5% available $P_2O_5$, 11.0% $K_2O$, and 3.8% MgO. It will be noted that more than 19% of the $K_2SO_4$ in this example is contributed from langbeinite. This was intentional. It was desirable to retard setting during polymerization of the ureaform.

While this invention has been described and exemplified in terms of its preferred embodiments, those skilled in the art will appreciate that modifications can be made without departing from the spirit and scope of the invention.

The embodiments of the invention in which an exclusive property or privilege is claimed are defined as follows:

1. A method for the preparation of a low bulk density absorbent fertilizer raw material which comprises mixing together in water at a temperature in the range of about 20° to about 100° C. a $CaSO_4$-contributing material and a $K_2SO_4$-contributing material to provide at least 0.5 mole of $K_2SO_4$ for each mole of $CaSO_4$ to form a thixotropic gel containing syngenite, the ratio of water to total solids being in the range of about 0.8 to about 1.5; drying said gel to eliminate at least about 70% of free water contained therein; and sizing the thus-dried material.

2. A method according to claim 1 wherein there is incorporated a gas to decrease the density of said gel, water soluble nitrogen compounds are incorporated in the reaction slurry, and the gel is dried at a gel temperature not exceeding about 105° C.

3. A method for the preparation of a low bulk density absorbent fertilizer raw material which comprises mixing in water at a temperature in the range of about 20° to about 100° C. normal superphosphate containing $CaSO_4$, and $K_2SO_4$ in an amount to provide at least 0.5 mole of $K_2SO_4$ for each mole of $CaSO_4$ to form a thixotropic gel containing syngenite, the mole ratio of water to total solids being in the range of about 0.8 to about 1.5; drying said gel to eliminate at least about 70% of the free water therein; and sizing the thus-dried material to a desired particle size.

4. A method according to claim 3 wherein a gas is incorporated into the aqueous mixture whereby the bulk density of the resulting gel is decreased.

5. A method according to claim 3 wherein up to about 19% of the $K_2SO_4$ is contributed by langbeinite and wherein the mole ratio of $K_2SO_4$ to $CaSO_4$ in the system is in the range between about 0.9 to about 1.3.

6. A method for the preparation of a low bulk density absorbent fertilizer raw material which comprises slurrying in water triple superphosphate and $K_2SO_4$ in an amount to provide at least about 1.3 moles of $K_2SO_4$ per mole of triple superphosphate to form a thixotropic gel containing syngenite, the ratio of water to total solids being in the range between about 0.8 and about 1.5; drying said gel to eliminate at least about 70% of free water in said gel; and sizing the thus-dried gel to desired particle size.

7. A method according to claim 6 wherein magnesium metal is incorporated in the aqueous mixture prior to gel formation to effect release of hydrogen gas by reaction with the free acid present in the triple superphosphate; the gel formation is effected at a temperature of about 40° C.; and the gel is dried at a gel temperature not exceeding about 105° C.

8. A sized absorbent fertilizer raw material having a bulk density in the range of about 12 to about 27 pounds per cubic foot when the size is in the range of −4 +12 Tyler containing gelled synthetic syngenite formed by the reaction of a $K_2SO_4$-contributing material with a $CaSO_4$-contributing material.

9. A sized absorbent fertilizer raw material having a bulk density in the range of about 12 to about 27 pounds per cubic foot when the size is in the range of −4 +12 Tyler containing gelled synthetic syngenite formed by the reaction of normal superphosphate and $K_2SO_4$.

10. A sized absorbent fertilizer raw material having a bulk density in the range of about 12 to about 27 pounds per cubic foot when the size is in the range of −4 +12 Tyler containing gelled synthetic syngenite formed by the reaction of triple superphosphate and $K_2SO_4$.

References Cited
UNITED STATES PATENTS

| | | | |
|---|---|---|---|
| 1,366,569 | 1/1921 | Kreiss | 71—45 |
| 2,082,809 | 6/1937 | Pennell | 71—63 |

DONALL H. SYLVESTER, *Primary Examiner.*

S. LEON BASHORE, *Examiner.*

R. BAJEFSKY, *Assistant Examiner.*